United States Patent [19]
Khoshnevisan et al.

[11] Patent Number: 5,336,884
[45] Date of Patent: Aug. 9, 1994

[54] HIGH RESOLUTION OPTICAL HYBRID ABSOLUTE INCREMENTAL POSITION ENCODER

[75] Inventors: Mohsen Khoshnevisan, Newbury Park; Jeffrey S. Schoenwald, Thousand Oaks; Jonathan P. Rode, Westlake Village; Raymond J. D. Smith, Newbury Park, all of Calif.; Bruce G. Kolloff, Sussex, N.J.; Steve Beccue, Oxnard, Calif.

[73] Assignee: Rockwell International Corporation, Seal Beach, Calif.

[21] Appl. No.: 907,412

[22] Filed: Jul. 1, 1992

[51] Int. Cl.$^5$ .............................................. G01D 5/34
[52] U.S. Cl. ........................... 250/231.18; 250/231.14
[58] Field of Search ...................... 250/231.13, 231.14, 250/231.18, 237 G; 356/375; 33/707

[56] References Cited
U.S. PATENT DOCUMENTS

| | | | |
|---|---|---|---|
| 3,058,001 | 10/1962 | Dertouzos | 250/231.14 |
| 3,982,106 | 9/1976 | Stutz | 250/237 G |
| 4,602,242 | 7/1986 | Kimura | 250/231.18 |
| 4,914,437 | 4/1990 | Kibrick et al. | 250/231.18 |
| 5,068,529 | 11/1991 | Ohno et al. | 250/231.18 |
| 5,073,711 | 12/1991 | Brininstool et al. | 250/231.18 |

Primary Examiner—David C. Nelms
Attorney, Agent, or Firm—John J. Deinken

[57] ABSTRACT

An optical encoder for sensing angular position includes a rotatable optical medium having a major surface and an axis of rotation perpendicular to the surface, with a plurality of uniformly sized angular sectors defined on the surface. An annular absolute track is defined on the surface concentric with the axis, a plurality of digital bits being formed on the surface in sequence along the absolute track within each sector. Each such bit is optically readable as a binary 1 or a binary 0, with each plurality of bits defining a binary word. A first series of optically detectable incremental marks are evenly spaced around a first incremental track on the surface. The binary word in a sector is optically read to identify the angular position of that sector and indicate the approximate angular position of the medium, while the first series of incremental marks can be optically detected to refine the approximate angular position indication. A source of light illuminates the surface along a fixed radius from the axis, while a digital track detector senses the illumination reflected from the absolute bits and a first incremental track detector senses the illumination reflected from the incremental marks. Signal processing and decoding means convert the output of the absolute track detector into a binary word and interpolate the precise angular position of the medium from the output of the first incremental track detector. An input absolute track optical fiber is connected between a absolute track optical coupler and proximate the surface of the medium, while a first input incremental track optical fiber is connected between a first incremental track optical coupler and proximate the surface. Output absolute track and first incremental track optical fibers are connected between the couplers and the track detectors for conveying reflected light from the tracks to the detectors.

30 Claims, 6 Drawing Sheets

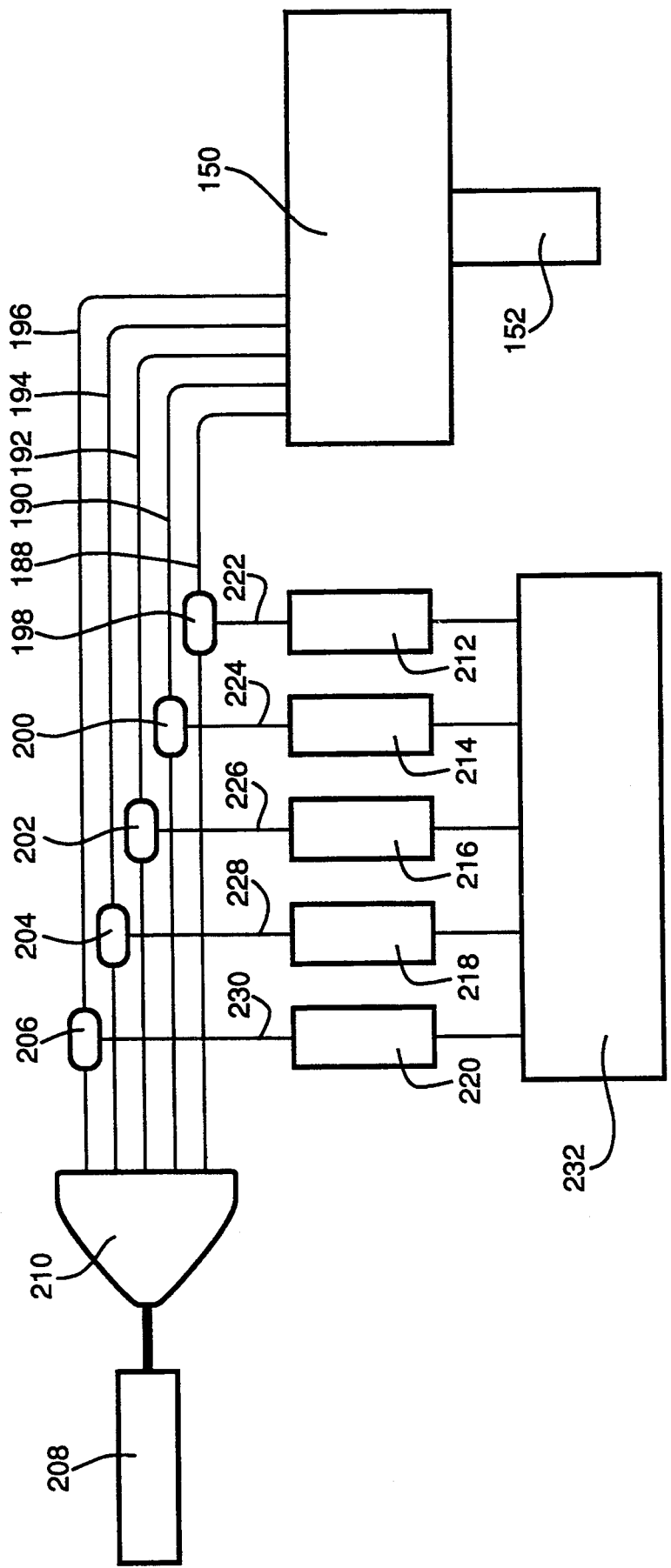

HIGH RESOLUTION OPTICAL HYBRID ABSOLUTE INCREMENTAL POSITION ENCODER

BACKGROUND OF THE INVENTION

This invention is concerned with optical encoders which are used to measure accurately the angular displacement of a shaft or rotating member. More particularly the invention relates to a technique for optically ascertaining the angular position of a rotating member using a combination of absolute and incremental sensing.

The need for precision measurement in a variety of devices demands an inexpensive, high resolution method for ascertaining angular position. Stepper motors, for example, as used in such diverse applications as gun turrets, paper making plants, machine tools, direct drive motors, and robotics applications, require a high precision indication of angular position. Such angular displacement information may be utilized in subsequent process steps or as a feedback indicator of system error and misalignment.

Prior art absolute encoders employ a disk having a series of abbreviated lines at various radii coupled with a multiple channel reader to directly read the position of the encoder in a binary format. While such a system is simple and inexpensive, it does not provide the accuracy required by modern high precision instrumentation.

Other prior art encoders use laser technology, such as the laser incremental encoder model X-1, manufactured by Canon. A complex series of prisms in this device is used to produce 225,000 sinusoidal waves per revolution. The 225,000 waves are each further subdivided into 80 pulses per wave to yield 18 million pulses per revolution. The principle employed in the laser rotary encoder is that of a grating disk having a series of radially oriented bars about its outer periphery. The radially oriented bars are very small and must be positioned on the disk with great precision. A grating disk having the required grating bar tolerances for the laser rotary encoder is difficult and expensive to fabricate. Furthermore, the grating disk is required to be used in conjunction with a phase plate having similarly strict manufacturing requirements.

The cost of such a high precision rotary encoder is consequently quite prohibitive. Furthermore, because of the electronic components in this apparatus, there are limitations on the operating environment in which such an encoder may be employed. The operating temperature of the encoder must remain within a temperature range of approximately 10° C. to 40° C. Otherwise, not only may inaccuracies be introduced into the measurements, but the encoder may be damaged or destroyed. Consequently there is a need in some low and high temperature position measurement applications to employ a device which does not require any electronic components in the position encoder head.

What is needed is an angular displacement rotary encoder having a precision and resolution which exceeds that available for encoders in its class. The cost of such an encoder should be considerably less than that associated with a complex laser rotary encoder, yet the resolution should be much greater than that obtainable with a standard direct digital read encoder.

SUMMARY OF THE INVENTION

By adapting compact optical disk technology to the measurement of rotary displacement, this invention provides a new technique for achieving high precision measurement of angular position with a significant reduction in the manufacturing cost of the measurement apparatus.

An optical encoder for sensing angular position includes a rotatable optical medium having a major surface and an axis of rotation perpendicular to the surface, with a plurality of uniformly sized angular sectors defined on the surface. An annular absolute track is defined on the surface concentric with the axis, a plurality of digital bits being formed on the surface in sequence along the absolute track within each sector. Each such bit is optically readable as a binary 1 or a binary 0, with each plurality of bits defining a binary word. A first incremental track is defined on the surface concentric with the axis, a first series of optically detectable incremental marks being formed on the surface and evenly spaced around the first incremental track. The binary word in a sector can be optically read to identify the angular position of that sector and thereby indicate the approximate angular position of the medium, while the first series of incremental marks can be optically detected to refine the approximate angular position indication and thereby indicate a more precise angular position for the medium.

The annular absolute track may include a binary start symbol, recorded on the absolute track within each sector and having a common value in all sectors to indicate the start of a sector, and a binary sector number recorded on the absolute track within each sector and having a unique value identifying the sector in which it is recorded.

The optical encoder may further include a second incremental track defined on the surface concentric with the axis, with a second series of optically detectable incremental marks formed on the surface and evenly spaced around the second incremental track, the number of marks in the second series being equal to the number of marks in the first series. In addition, each mark within the second series is displaced in a circumferential direction with respect to a corresponding mark in the first series by an angular amount equal to one eighth the spacing of the marks in the first series. The second series of marks can be optically detected to, in conjunction with the first series of marks, refine the approximate angular position indication.

The annular absolute track may further include a binary start symbol, recorded on the absolute track within each sector and having a common value in all sectors to indicate the start of a sector, and a base 3 sector number recorded on the absolute track within each sector and having a unique value identifying the sector in which it is recorded, each digit of the sector number being encoded by means of its radial alignment with a mark in the first incremental track or a mark in the second incremental track.

The optical encoder may additionally include third and fourth incremental tracks defined on the surface concentric with the axis, with a third series of optically detectable incremental marks displaced with respect to the first series by one fourth the spacing of the marks and a fourth series of marks displaced by three eighths the spacing of the marks. The third and fourth series of marks can be optically read to, in conjunction with the first and second series of marks, further refine the approximate angular position indication.

In this embodiment, the annular absolute track may further include a binary start symbol, recorded on the absolute track within each sector and having a common value in all sectors to indicate the start of a sector, and a base 5 sector number recorded on the absolute track within each sector and having a unique value identifying the sector in which it is recorded, each digit of the sector number being encoded by means of its radial alignment with a mark in the first incremental track, a mark in the second incremental track, a mark in the third incremental track, or a mark in the fourth incremental track.

The optical encoder may be further equipped with a source of light for illuminating the surface along a radius from the axis, the illuminated radius being fixed with respect to rotation of the medium. A absolute track detector senses the portion of the illumination reflected from the bits within the absolute track, while a first incremental track detector senses the portion of the illumination reflected from the marks within the first incremental track. Signal processing and decoding means are provided for converting the output of the absolute track detector into a binary word and for interpolating the precise angular position of the medium from the output of the first incremental track detector.

The optical encoder may include as well an opaque mask positioned between the light source and the optical medium and proximate to the surface of the medium, with a absolute track opening in the mask for permitting illumination of a precise area of the absolute track and a first incremental track opening in the mask for permitting illumination of a precise area of the first incremental track.

A non-rotating read head may slidably engage the optical medium. A absolute track optical collimator is affixed to the read head for conveying light from the light source to the absolute track and conveying light reflected from the absolute track to the absolute track detector. A absolute track optical coupler is connected between the light source, the absolute track optical collimator, and the absolute track detector. A track optical fiber couples the digital track optical coupler to the absolute track optical collimator. A first incremental track optical collimator is affixed to the read head for conveying light from the light source to the first incremental track and conveying light reflected from the first incremental track to the first incremental track detector. A first incremental track optical coupler is connected between the light source, the first incremental track optical collimator, and the first incremental track detector. A first incremental track optical fiber couples the first incremental track optical coupler to the first incremental track optical collimator.

DESCRIPTION OF THE DRAWINGS

FIG. 6 is a schematic diagram of the encoder system of the present invention embodying the encoder assembly of FIG. 5.

DESCRIPTION OF THE INVENTION

Figure 1:
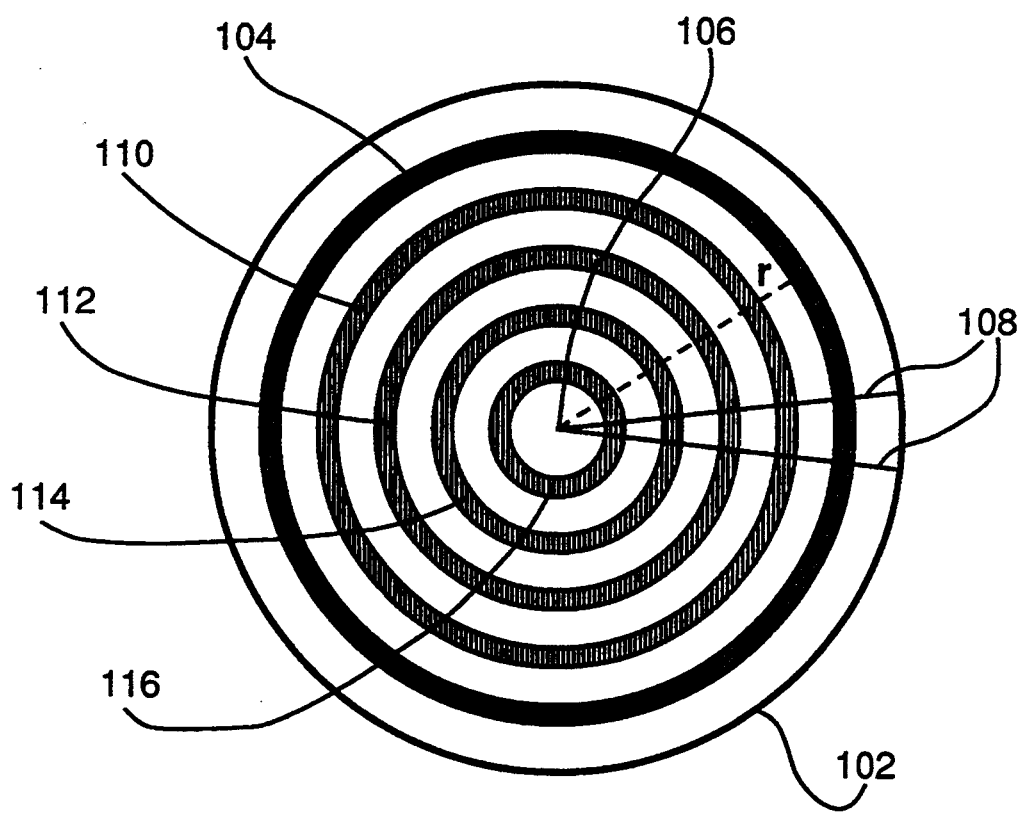
FIG. 1 is a plan view of an optical encoder disk constructed according to the present invention.

This invention provides a new technique for precision sensing of angular position using a hybrid incremental absolute optical encoder, with the precision depending upon the number of tracks used. In the particular embodiments discussed below, for example, angular displacement can be resolved to within 1/1,000; 1/10,000; 1/40,000; or 1/160,000 of a single rotation. Additional improvements in resolutions will be possible as advances are made in photolithography, disk fabrication, and shorter wavelength lasers.

The inventive solution employs a new approach to optical rotary position encoding which takes advantage of the existing body of technology developed for the manufacture, recording, and reading of compact disks. Compact disk technology utilizes interferometric reflection. Data is stored in a compact disk by embossing, which forms a step or a pit in a plastic layer on the disk. The step or pit is formed to a depth equal to one fourth the wavelength of the light which is to be used in reading the disk. During reading of the data, a laser beam illuminates an area that includes both the step or pit and an additional area around it equal to that of the step or pit. Light which is reflected from the pit will be 180 degrees out of phase with respect to light reflected from the surrounding area. The interference between these reflections causes the net optical power reflected from that area of the disk to be near zero. In contrast, the absence of a pit in a region being viewed by the detector will produce a significant non-zero optical signal, since all of the light reflected will be in phase. Information can thus be stored in binary format on such a disk by designating either the presence or the absence of a pit as a binary "1", while the other state is designated as a binary "0".

An encoder disk for use in the optical encoder of the present invention could be fabricated from glass, as is conventionally done, with the encoding accomplished by an overlayer of plastic in which the coding pits are embossed from a master die. The plastic would then be covered by a high reflectance metal layer, typically aluminum or gold.

A circular disk, utilizing state of the art compact disk construction and having a radius of approximately three centimeters, can be employed satisfactorily as a position encoder to give the necessary resolution. One embodiment of such a rotatable disk, referred to hereinafter as an encoder disk, is shown in plan view in FIG. 1 as disk 102, which is provided with an annular absolute track 104 at a radius r and concentric with the disk's axis of rotation 106. A number of uniformly sized angular sectors, such as the sector area outlined by the lines 108, are designated for the surface of the disk 102. The disk might, for example, be divided into 1,000 such angular sectors. The choice of 1,000 sectors is based upon the limitation imposed by the radius of the encoder disk, coupled with the physical dimensions of the pits used in compact disk technology. Larger encoder disks could be divided into more sectors, while smaller disks would require fewer divisions. The disk also includes annular first, second, third, and fourth incremental tracks 110, 112, 114, and 116 defined on the surface concentric with the axis 106.

Figure 2:
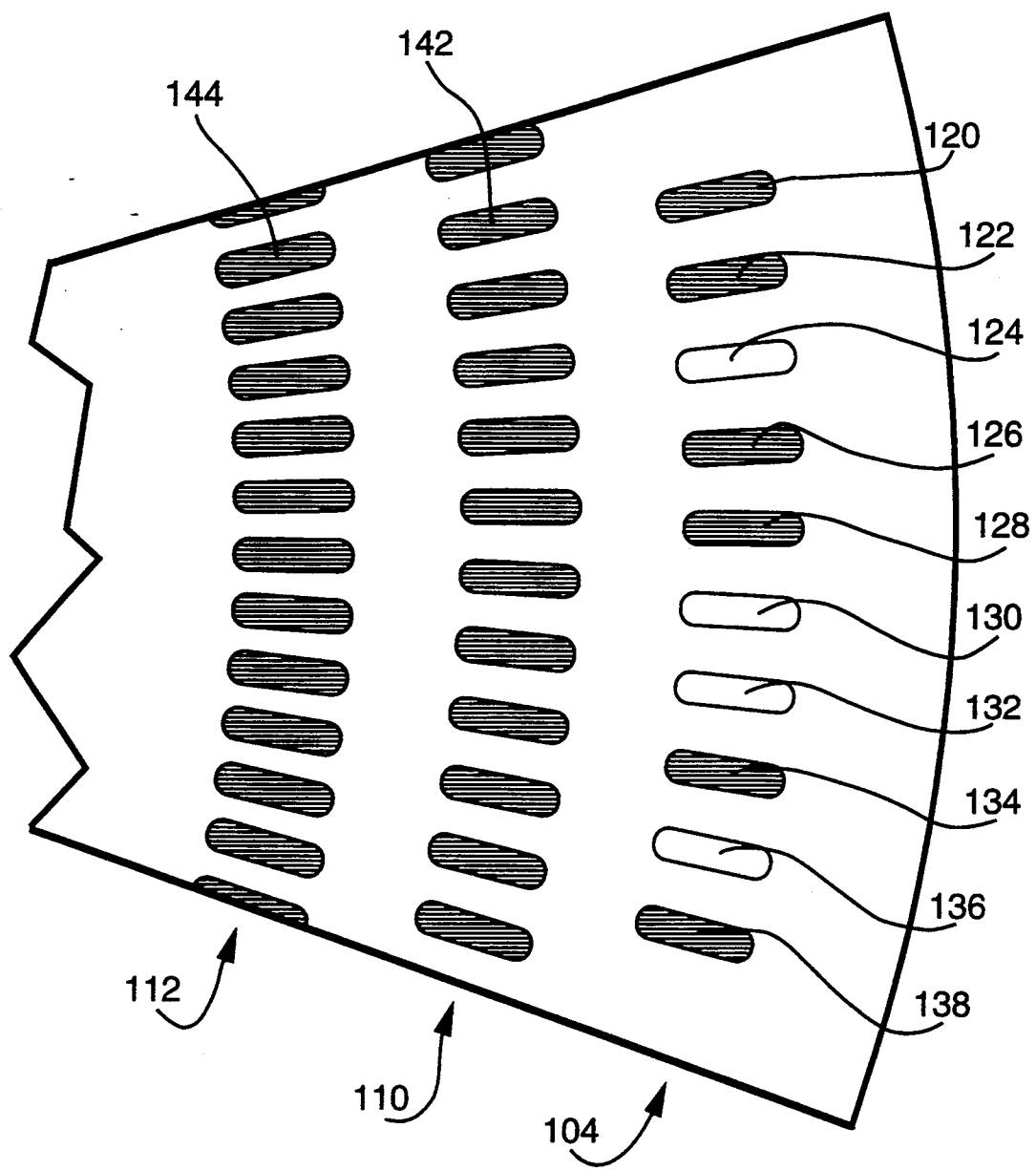
FIG. 2 is an expanded view of a portion of the encoder disk of FIG. 1 illustrating the format of the absolute incremental tracks on the surface of the disk.

FIG. 2 is an expanded view of FIG. 1 illustrating a portion of one angular sector. Within the absolute track 104, a series of digital bits are formed on the surface of the disk in sequence along the track within each sector. Each such bit is optically readable as a binary 1 or a binary 0, and each series of the bits within a sector defines a binary word. In the sector shown, for example, are ten digital bits 120-138. Each such bit also corresponds to a step or pit as referred to above, wherein "dark" bits, such as the bits 120, 122, 126, 128, 134, and 138, correspond to locations where pits produce out of phase light which interferes with light reflected from the surrounding area, producing a minimum of reflected optical energy. "Bright" bits, such as the bits 124, 130, 132, and 136, correspond to locations where there is no pit, so that a maximum amount of optical energy is reflected from these areas. As stated above, the bit "sense" could equally well be reversed, with reflected optical energy indicative of either a logical "one" bit or a logical "zero" bit.

In FIG. 2, note that there are ten bits within the digital word contained in the sector. The first two bits 120 and 122 are utilized for a start symbol, leaving eight bits with which position information may be encoded.

Depending upon the size of the encoder disk 102 and other factors, a typical computation for the sector size is as follows.

$$rd\phi = [r*360*(\pi/180)]/1000 \qquad 1)$$

where $r\,d\phi$ is the length of the sector and $d\phi$ is the angle subtended, i.e., 1/1000 of $2\pi$. Given a radius of three centimeters, for example, which was chosen to achieve an angular resolution of greater than one in 100,000, the sector would be 188 microns long. A digital string of ten bits, as shown below, can provide an absolute address for the sector to a resolution of 1 part in 1,000. These ten bits can fit comfortably in the center of the angular sector, leaving blank space on either side of the digital code segment for word isolation.

In addition to the absolute track 104, the first incremental track 110 and the second incremental track 112 are depicted in FIG. 2. The first track contains a first series of optically detectable marks, such as the mark 142, which are evenly spaced around the track. In the embodiment discussed above, wherein an encoder disk with a three centimeter radius is utilized, there are 10,000 such marks 142 positioned around the disk in the first incremental track. In the preferred embodiment these marks have a center-to-center distance of about 18.8 microns and a width of about 4.0 microns, dimensions which are easily within the range of current compact disk optical lithography technology.

The absolute track 104 and the first incremental track 110 provide incremental position information relative to the last sector word that was read, in addition to indicating the direction of angular displacement. Absolute position is therefore provided by first identifying the digital word in the last digital code segment read, which indicates the position of the corresponding angular sector. By counting the incremental marks in the track 110, the incremental distance relative to the start of the sector can be determined to deduce the absolute position of the encoder. If, for example, ten incremental marks were used in each sector, this combination of a absolute track and a single incremental track would yield an accuracy of one part in 10,000.

Figure 3:
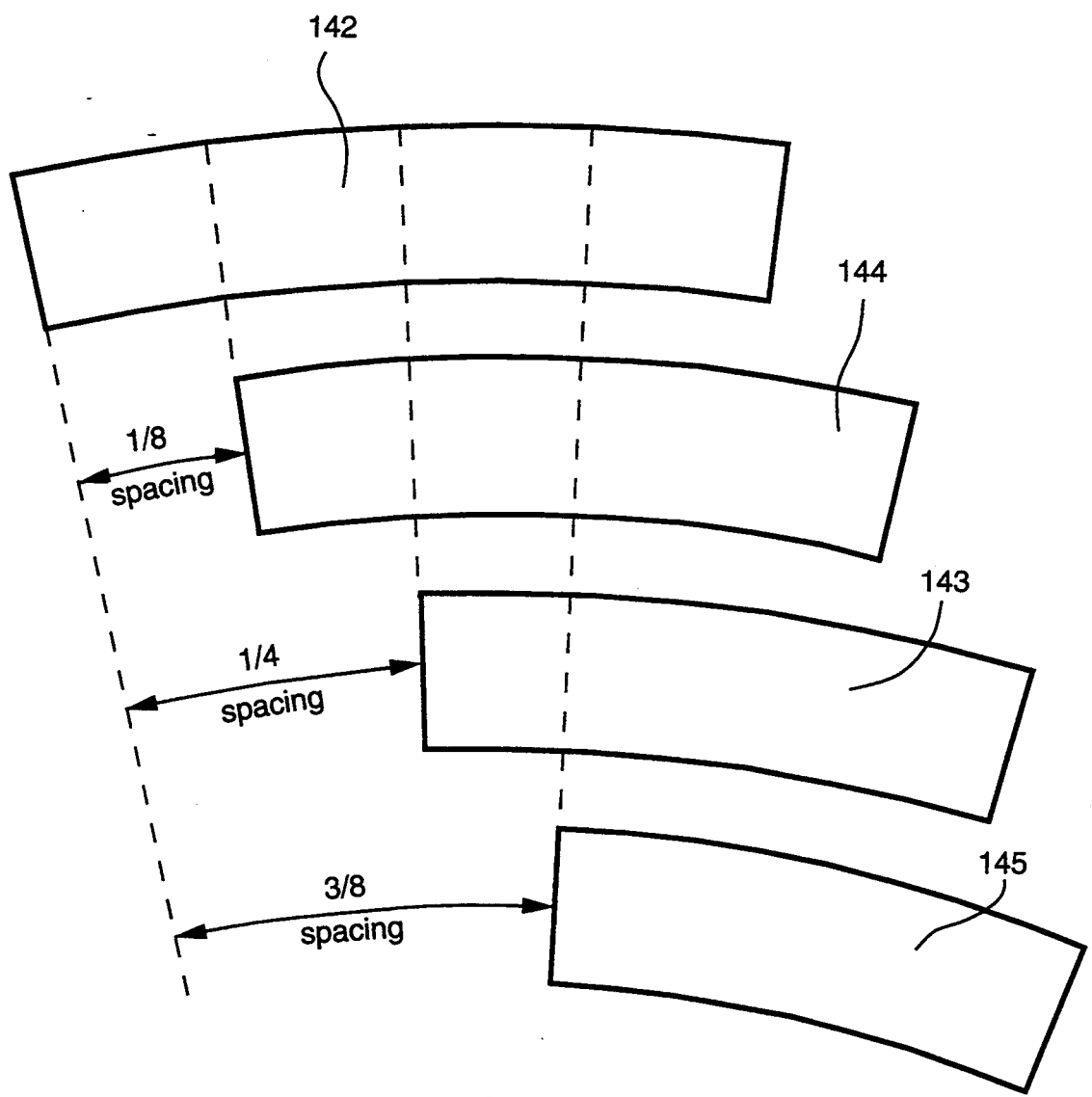
FIG. 3 is a diagram schematically illustrating the relative positions of the four incremental tracks in the five track embodiment of the optical encoder disk shown in FIG. 1.

As mentioned above, four incremental tracks 110-116 are provided in the preferred embodiment. The second analog track 112, which is also shown in the expanded view of FIG. 2, includes a second series of marks, such as the mark 144, which are evenly spaced around the track. The number of marks in the second series is equal to that in the first series. Moreover, the marks in the second series are displaced in a circumferential direction with respect to corresponding marks in the first series by an angular amount equal to one eighth the spacing of the marks in the first series. Similarly, the third and fourth incremental tracks 114 and 116 contain a third and a fourth series of marks, each of which also includes the same number of marks as in the first series. The marks in the third series, however, are displaced in a circumferential direction with respect to a corresponding mark in the first series by an angular amount equal to one fourth the spacing of the marks in the first series, while the marks in the fourth series are displaced in a circumferential direction with respect to a corresponding mark in the first series by an angular amount equal to three eighths the spacing of the marks in the first series. FIG. 3 is a diagram schematically illustrating the relative positions of the marks in the four incremental tracks 110, 112, 114, and 116 in the five track embodiment of the optical encoder disk shown in FIG. 1, with marks 142, 144, 143, and 145 depicted for tracks 110, 112, 114, and 116, respectively.

One particular embodiment of the first absolute track involves an implementation using a base 5 numbering system to indicate the absolute position and the direction of rotation of the disk. The start symbol and encoded number for the first 20 and last 20 sectors of an exemplary base 5 encoding scheme are depicted schematically in FIG. 4. The technique for accomplishing this requires two or more tracks of data, i.e., one absolute track and one or more incremental tracks, with N tracks implying the use of a base N number system. The absolute position data must be readable for either direction of rotation and must include a unique "start symbol" to unambiguously determine the starting point of the digital information recorded on the absolute track in each sector.

When a total of five tracks are employed, 1,000 unique numbers (positions) are encoded in a like number of sectors on the disk. The unique numbers are ultimately translated to base 2, where ten bits are required to distinguish among the 1,000 numbers. A "start symbol" is required at the start of each number to unambiguously determine its position. The start symbol must be unique when read forward or backward, and must be placed every 1/1000 of a revolution in the exemplary embodiment. Use of the CD technology imposes certain constraints. Because a quarter-wave pit is used to reflect half the spot size back out of phase, resulting in an optical null, all marks must have the same width, although the spacing between the marks may vary. Furthermore, because of size constraints limiting the number of marks which can be placed within each sector in the absolute track, a strictly binary encoding scheme may not be possible. Consequently, in order to pack the data more efficiently and simplify the decoding electronics, a base 5 number system is used. The symbol '0' is represented by a missing mark, symbol '1' by a mark which is aligned with the marks in the first incremental track (shown in FIG. 4 as a cross-hatched rectangle in the leftmost position within a digit column), '2' by a mark which is aligned with the marks in the second incremental track (in FIG. 4, a rectangle shifted one position to the right within a digit column with respect to the position of a '1' symbol), '3' by a mark which is aligned with the marks in the third incremental track (in FIG. 4, a rectangle shifted two positions to the right within a digit column with respect to the position of a '1' symbol), and '4' by a mark which is aligned with the marks in the fourth incremental track (in FIG. 4, a rectangle shifted three position to the right within a digit column with respect to the position of a '1' symbol).

Figure 4:
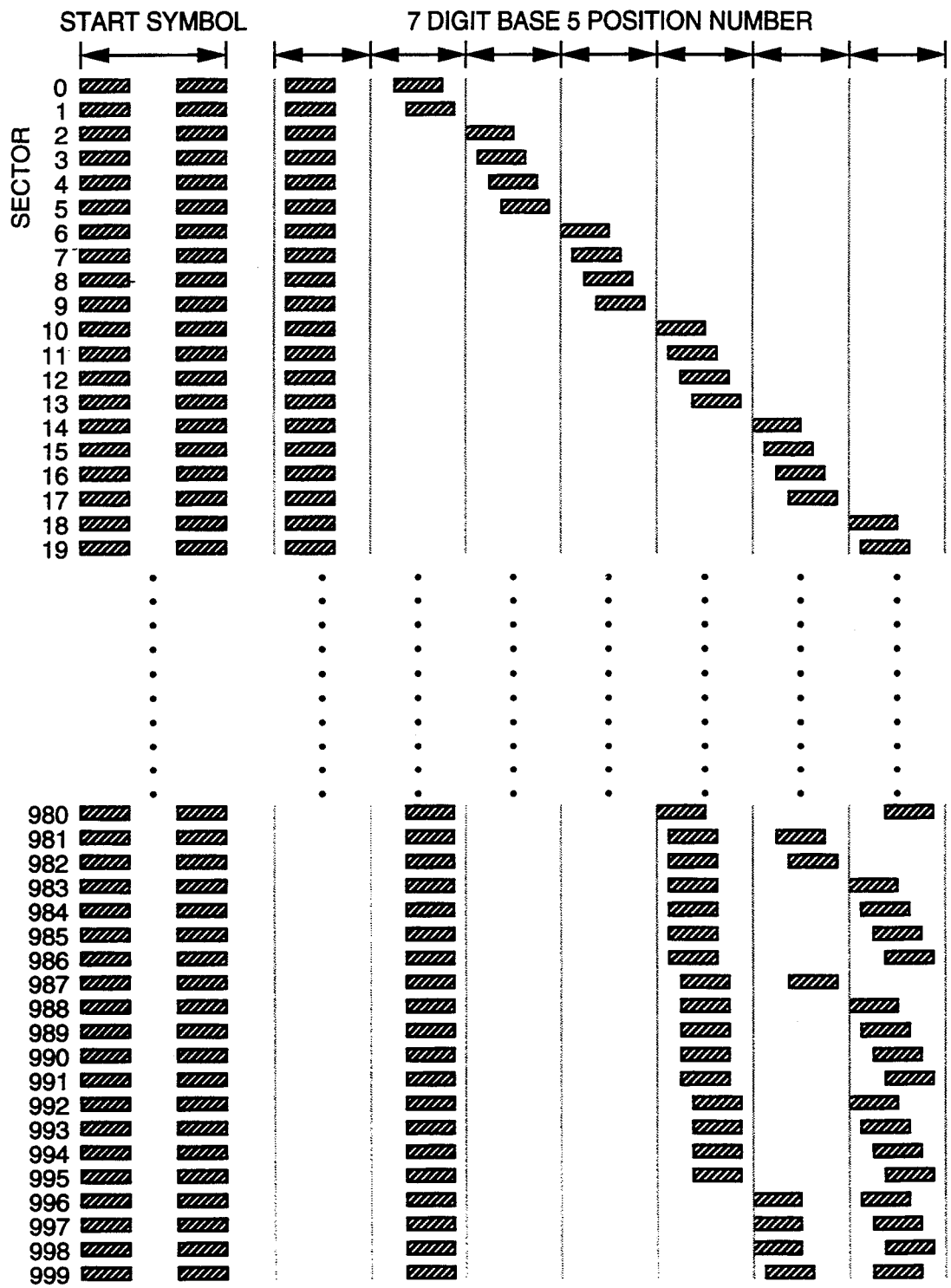
FIG. 4 schematically depicts the start symbol and encoded number for the first 20 and last 20 sectors of an exemplary base 5 encoding scheme.

The sequence '11' (in FIG. 4, represented in each sector row by the left two cross-hatched rectangular marks) is designated as the start symbol. Seven of the remaining base 5 marks in each sector are then used to encode 1,000 unique numbers. The CD technology, however, imposes an additional constraint, which permits no two marks to be closer than the minimum spacing. This prevents, for example, a '5' being followed by a '1' (there is some flexibility in this limitation, depending on the length chosen for each mark and the number of tracks employed, since the space between marks increases as tracks are placed radially further from the center of the encoder). Furthermore, the start symbol '11' may never occur in any number, to avoid confusion with the start symbol. Assuming a conservative constraint that none of the symbols in the set {1,2,3,4} can be followed by a smaller digit except 0, there are 1,954 numbers remaining that can be represented in seven digits base 5. In this implementation, as will readily be understood by those skilled in the art, a set of adders and an EPROM can be utilized to convert the base 5 number to a binary (base 2) number.

A set of numbers for a particular embodiment of this coding scheme, as illustrated by the coding for the first 20 and last 20 sectors in FIG. 3, can be readily generated by one skilled in the art using the requirements and limitations discussed above.

When the information available from the second incremental track is combined with that from the absolute track and the first incremental track, the achievable resolution in the exemplary embodiment is doubled to one part in 20,000. Moreover, since the two series of marks 142 and 144 in the two incremental tracks are 90° out of phase, quadrature interpolation can be utilized to further increase the resolution to one part in 40,000. Such quadrature interpolation requires only four additional bits of accuracy and is therefore easily realizable using an ordinary microprocessor or logic circuit.

With the addition of the third and fourth incremental tracks 114 and 116, a mark is provided for each 45° of phase change in the incremental series. This is equivalent (in an embodiment having ten marks per incremental track per sector) to providing forty incremental marks per angular sector. The raw resolution with the additional information provided by the employment of the four incremental tracks 110–116 is increased to one part in 40,000. Again, digital interpolation of the raw information can be accomplished to yield a factor of four multiplication, resulting in an accuracy in the illustrative embodiment of one part in 160,000.

Each of the tracks, namely the absolute track 104 and the four incremental tracks 110–116, requires a channel for optical addressing. The optical channels associated with the four incremental tracks in essence require only four additional bits for the final accuracy figure. Encoding is therefore accomplished with one track, the absolute track 104, for an absolute digital resolution of 1,000 parts per revolution, while one, two, or four incremental tracks provide incremental position information relative to the last sector position and four bit digital interpolation of the incremental tracks provides the final resolving power.

Within the industrial environment in which encoders frequently must operate, there are several practical problems which must be addressed. Typically, the rotating member on which the encoder disk is mounted will not consistently rotate within a single plane. Such deviations from in-plane rotation are known as "wobble", which interferes with the ability to read the encoder disk consistently and accurately. Wobble may develop for a variety of reasons, such as temperature changes in the machine driving the encoder disk or degradation of the attachment between the encoder disk and the device whose angular position is to be measured. Furthermore, when elevated temperatures are present in the machinery to be measured, the heat can degrade the electronics associated with commonly available encoders. Heat damage is especially likely when a metal rotating shaft is utilized to transmit angular displacement to the encoder device, since the metal shaft forms an efficient conductor of heat.

Figure 5:
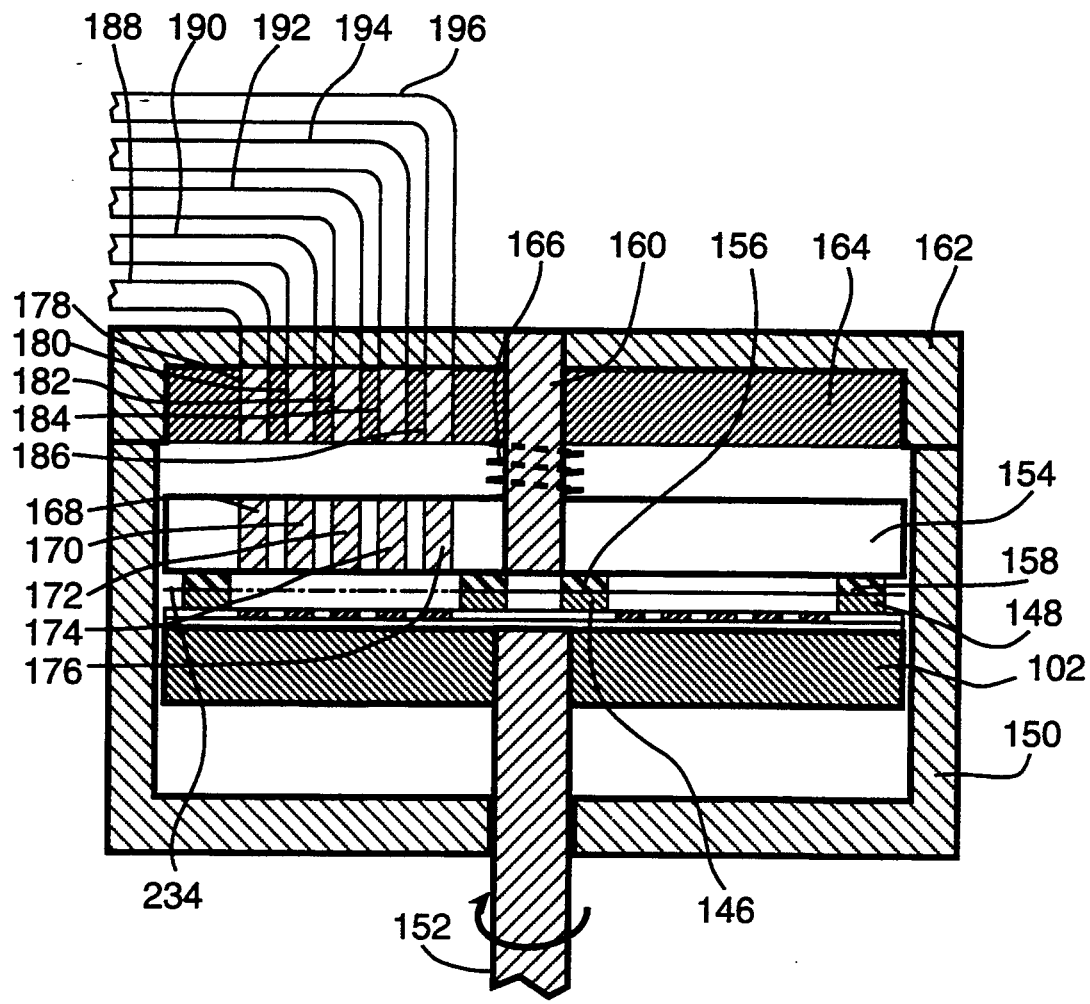
FIG. 5 illustrates in cross sectional side view an encoder assembly housing the encoder disk shown in FIGS. 1-2.

In accord with the device and method of the present invention, these limitations arising from wobble and heat sensitivity can be ameliorated or eliminated from the encoding function. FIG. 5 is a cross sectional view of an encoder assembly using the encoder disk of FIGS. 1 and 2. Here, first and second annular low friction coatings 146 and 148 have been applied to the surface of the encoder disk 102. A housing 150 encases the encoder and provides other structure necessary to allow angular displacement to be accurately determined despite wobble and despite a thermally harsh operating environment. The housing 150 contains an aperture at one end for rotatably admitting an encoder shaft 152 into the interior. The encoder shaft is attached to the encoder disk 102 so that both the encoder shaft and the encoder disk rotate together.

Opposing the encoder disk 102 is a read head disk 154. The read head disk 154 carries a pair of skids 156 and 158 which are preferably made of a fluorocarbon material or coated with a fluorocarbon coating such as Teflon ®. The skid 156 evenly opposes the low friction coating 146, while the skid 158 evenly opposes the low friction coating 148. The read head disk 154 is secured by a shaft 160. A cover 162 is rigidly attached to the housing 150 and is removable from the housing to provide service and maintenance access thereto. The inside of the cover 162 is partially packed with a filler material 164 which serves to provide additional support for the shaft 160. The shaft 160 is rigidly connected to the cover 162 and the read head disk 154 to prevent rotation of the read head disk.

A compression spring 166 surrounds the shaft 160 between the filler material 164 and the read head disk 154 to urge the read head disk toward the encoder disk 102. This biasing of the read head disk brings the skids 156 and 158 into direct sliding contact with the low friction coatings 146 and 148 on the encoder disk. Alternatively, the read head could be mounted on the back side of the encoder disk to simplify the design. In addition, the shape of the marks in the absolute and incremental tracks can be chosen to minimize the sensitivity of the design to in-plane wobble of the encoder disk.

A series of first collimating transfer optics 168, 170, 172, 174, and 176 are located in the read head disk 154. These elements are an array of optical fibers with appropriate focusing optics or alternatively are a series of gradient index (GRIN) lens rods. Each one of the first collimating transfer optics is positioned over a single track of the encoder disk 102. In the cover 162 and opposing the first collimating transfer optics is a set of second collimating transfer optics 178, 180, 182, 184, and 186 mounted within the filler material 164. Each element in the second collimating transfer optics is aligned with a corresponding element in the series of first collimating transfer optics. A series of five optical fibers 188, 190, 192, 194, and 196 extend from a distant point with respect to the rotary encoder assembly to connect with corresponding elements in the second series of collimating transfer optics. In this manner, a single optic channel or connection is made between each fiber in the set of optical fibers 188–196 and thereby to each of the five tracks of the encoder disk 102, namely the absolute track 104 and the four incremental tracks 110, 112, 114, and 116. It may be desirable to provide an opaque mask 234 positioned close to the surface of the encoder disk. This mask contains openings which permit illumination of a precise area of the absolute track and the incremental tracks in order to ensure a more effective interferometric effect in the reading of dark bits.

Note the combination of clearances between the read head disk 154 and the filler material 164. The mechanical construction of the rotary encoder assembly 150 enables the read head disk to follow the encoder disk in the event that the encoder disk develops wobble. The limited support which the read head disk receives near its concentric center allows any such wobble forces to be effectively transmitted into a following motion. As will be appreciated by those skilled in the art, if the depth of field of the optical elements 178–186 is sufficiently long, the read head disk 154 and its associated collimating optics 168–176 will not be required. Moreover, if the optical fibers 188–196 can be held in close proximity to the encoder disk 102, no focussing optical elements will be needed. In the latter implementation, however, precision alignment is required. This alignment may be provided, for example, by etched grooves in a silicon or other substrate, which can be accomplished by chemical or mechanical ruling or machining.

Now referring to FIG. 6, a schematic diagram of the hybrid absolute incremental system of the present invention is shown incorporating the rotary encoder assembly of FIG. 5. The set of optical fibers 188–196 shown in FIG. 5 extends from the rotary encoder assembly 150 to a series of fiber optic couplers 198, 200, 202, 204, and 206. These fiber optic couplers are typically three port devices which allow light to be introduced into a first port for transmission out of a second port. Light returning to the second port is redirected to a third port. In this manner, a laser or other light source can be introduced at the first port to be routed through the second port to a remote location. Light returning to the second port is directed to the third port rather than back to the source, to better enable the returning light to be measured and detected without interference from the source.

Thus the first ports of the fiber optic couplers are connected to a light source in the form of laser 208. A fanning or dispersion coupler 210 is utilized to couple light from the laser into each of the first ports of the fiber optic couplers 198–206. In this manner, a single laser is configured to supply light in the same manner as would five separate lasers. Those skilled in the art will appreciate that an optical isolator may be necessary to prevent feedback to the laser 208 and the resulting instability in the signal level. A light emitting diode or other incoherent light source would not require an isolator.

The third ports of the fiber optic couplers are each individually connected to a series of photosensitive detectors 212, 214, 216, 218, and 220 by means of a series of optical fibers 222, 224, 226, 228, and 230. The detectors convert the optical signals from the second ports of the fiber optic couplers into electrical signals. A signal processing and decoding device 232 is electrically connected to the detectors 212–220. The signal processing and decoding device is typically a computer, a microprocessor, or digital logic which is programmed to read, interpret, and output the digital signals it has received from the detectors. The second ports of the fiber optic couplers 198–206 are connected to the optical fibers 188–196 both to transmit light to, and receive digital signals from, the rotary encoder assembly 150.

The optical coupling could also be achieved with an alternative arrangement which allows the three port fiber optic couplers to be eliminated and delivers the laser light to the encoder assembly through separate illumination fibers. The light reflected from the disk is collection in this scheme by a set of collection fibers which are directly connected to the detectors for each track. Depending on the application and the desired length of the fibers, this approach may provide a lower cost option by eliminating the fiber optic couplers.

Referring to FIGS. 4 and 5, the operation of the high resolution optical hybrid absolute incremental position encoder of the present invention is as follows. Light from the laser 208 is directed into the fiber optic couplers 198–206. This light propagates from the second ports of the optic couplers along the optical fibers 188–196 and into the second collimating transfer optics 178–186, where the cross sectional area in which the light is propagating is somewhat expanded. This expansion of the cross sectional area facilitates the transmission and reduces the losses of the light as it propagates between the first collimating transfer optics 168–176 and the second collimating transfer optics 178–186. An expanded cross sectional area of light in this gap serves to mitigate the loss of light through any misalignment between the first and second collimating transfer optics due to displacement of the read head disk. The optical fibers 188–196 should preferably be single mode fiber to preserve the interferometric effect caused by reflection of light from the pits and the surrounding surface. Multimode fiber will scramble and degrade the interference signal over the length of the fiber.

The light propagates across the gap and into the first collimating transfer optics 168–176, from which it is positioned to focus upon the particular track on the encoder disk with which it is associated. Consequently, the first collimating transfer optics contain focussing optics on the side facing the encoder disk to efficiently direct light to the encoder disk and collect the reflected light. The second collimating transfer optics are designed to match the numerical aperture of the set of optical fibers 188–196. The first collimating transfer optics 168–176 act both to focus the downward traveling input beams on the encoder disk and to capture the beams reflecting from the surface of the encoder disk. The focal spot size on the encoder disk must be chosen for tolerance to fluctuations in the position of the encoder disk with respect to the read head disk and lateral tolerance due to circular shifts resulting from wobble.

The focussing function could also be accomplished by miniature binary optic lenses, by "lensing" the ends of rods, or by using gradient index (GRIN) lenses of the correct pitch to focus light on the encoder disk and collect the reflected signals. The latter approach is more forgiving of alignment tolerances for collecting the light reflected from the encoder disk and provides for communication of an expanded collimated beam between the read head disk and any such GRIN lenses in the first collimating transfer optics.

During angular displacement detection, the encoder shaft 152 turns along with the machinery to which it is connected, also rotating the encoder disk 102. Reflections from the encoder disk occur in the manner as described above for the dark bits, bright bits, and incremental marks on the encoder disk. Since the read head disk 154 is slidably engaged with the encoder disk, any wobbling of the encoder disk will cause congruent wobbling of the read head disk. Even if congruent wobbling occurs, the close contact of the read head disk against the encoder disk ensures uniformity of the gap between the encoder disk and the first collimating transfer optics 168–176. The uniformity of this gap ensures that the first collimating transfer optics will retain its focus upon each respective track of the encoder disk.

Light reflected from each of the tracks on the surface of the encoder disk is transmitted into the associated element of the first collimating transfer optics and thence to the second collimating transfer optics 178–186. Light from the second collimating transfer optics is impedance matched into the optical fibers 188–196. Again, the information from each track is kept segregated from the information in the other tracks, as each track of information is guided into an associated single optical fiber. Light propagated through the optical fibers is routed from the second to the third ports of the couplers 198–206 and into the detectors 212–220, where the optical signals are converted to digital electrical signals. The digital electrical signals are then directed into the signal processing and decoding device 232 for further treatment. The signal processing and decoding device is not required to be an unusually high speed device. If, for example, a maximum rotation speed of 2,500 revolutions per minute, or 42 revolutions per second, is assumed, the maximum bit sampling rate needed to read the incremental tracks 110-116 at the lowest Nyquist rate would be:

$$2*42 \text{ rev/sec} * 10 \text{ bits/sector} * 1000 \text{ sectors} = 840 \text{ kbits/sec} \quad (2)$$

This data rate represents a very conservative clock rate for commercially available computing systems. Packing the bits of the absolute track 104 into a portion of the digital code segment, rather than evenly distributing them throughout each angular sector, to spatially isolate words would slightly increase the required read rate to the order of about one MHz.

It is to be understood that the individual optical fibers 188–196 and individual fiber optic couplers 198–206 can be replaced by a single fiber used in conjunction with a series of wavelength division multiplex couplers. The use of wavelength division multiplex couplers would require that each track of the encoder disk operate on a separate wavelength. This would complicate the design somewhat, but would facilitate the use of a single fiber in place of multiple optical fibers.

The preferred embodiments of this invention have been illustrated and described above. Modifications and additional embodiments, however, will undoubtedly be apparent to those skilled in the art. Changes in the materials, orientation, method of manufacture, and other characteristics and design parameters, for example, are contemplated to be within the spirit and scope of the claimed invention. Furthermore, equivalent elements may be substituted for those illustrated and described herein, parts or connections might be reversed or otherwise interchanged, and certain features of the invention may be utilized independently of other features. The absolute track encoding technique, for example, can also be applied where different numbers of incremental tracks are employed. Of special interest are the cases of two tracks, where the method is slightly modified, and three tracks, where conventional quadrature data can be concurrently implemented. There are cost savings to be had by minimizing the number of tracks, while performance is improved by increasing the number of tracks. In the three track implementation, the two inner tracks are conventional, with a standard 90 degree quadrature. The outer track in such an embodiment can use base 3 numbering, implemented identically to that described in the five track case but with a packing density higher than that which could be achieved with a binary or grey-code scheme. The use of two tracks represents substantial cost reduction. In this case, the encoding scheme reduces to base 2 and there is no start symbol. In this implementation, however, no quadrature is available to determine direction. A slight modification of this scheme can provide adequate performance. The start symbol can be encoded as a track in phase with the incremental track. All other bits are then encoded at a 90 degree phase shift with respect to the incremental track. This design will allow the direction in which the encoder disk is rotating to be determined on any digit but the start symbol, while only two bits are lost in the data track. Consequently, the exemplary embodiments should be considered illustrative, rather than inclusive, while the appended claims are more indicative of the full scope of the invention.

We claim:

1. An interferometrically readable optical encoder for sensing angular position, comprising:
   a rotatable optical medium having a data storage layer and an axis of rotation perpendicular to the layer, a plurality of uniformly sized angular sectors being defined in the layer;
   an angular absolute track defined in the layer concentric with the axis;
   a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;
   a first annular incremental track defined in the layer concentric with the axis; and
   a first series of incremental marks formed in the layer and evenly spaced around the first incremental track, each such incremental mark being detachable by interferometric reflection of coherent light, whereby the binary word in a sector can be read to identify the angular position of that sector and thereby indicate the approximate angular position of the medium, and whereby the first series of incremental marks can be detected to refine the approximate angular position indication and thereby indicate a more precise angular position of the medium.

2. The optical encoder of claim 1, wherein the annular absolute track further comprises:

at least one start mark formed in the absolute track within each sector and having a common value in all sectors to indicate the start of a sector; and wherein the binary work within each sector has a unique value identifying the sector.

3. The optical encoder of claim 1, further comprising:

a second annular incremental track defined in the layer concentric with the axis;

a second series of incremental marks formed in the layer and evenly spaced around the second incremental track, each such incremental mark being detectable by interferometric reflection of coherent light, the number of marks in the second series being equal to the number of marks in the first series and each mark within the second series being displaced in a circumferential direction with respect to a corresponding mark in the first series by an angular amount equal to one eight the spacing of the marks in the first series, whereby the second series of marks can be detected to, in conjunction with the first series of marks, refine the approximate angular position indication.

4. The optical encoder of claim 3, wherein the annular absolute track further comprises:

at least one start mark formed in the absolute track within each sector and having a common value in all sectors to indicate the start of a sector; and wherein the binary word within each sector further comprises a base 3 word having a unique value identifying the sector, each binary digit of the word being encoded in base 3 by means of its radial alignment with a mark in the first incremental track or a mark in the second incremental track.

5. The optical encoder of claim 3, further comprising:

a third annular incremental track defined in the layer concentric with the axis;

a third series of incremental marks formed in the layer and evenly spaced around the third incremental track, each such incremental mark being detachable by interferometric reflection of coherent light, the number of marks in the third series being equal to the number of marks in the first series and each mark within the third series being displaced in a circumferential direction with respect to a corresponding mark in the first series by an angular amount equal to one fourth the spacing of the marks in the first series;

a fourth annular incremental track defined in the layer concentric with the axis; and a fourth series of incremental marks formed in the layer and evenly spaced around the fourth incremental track, each such incremental mark being detectable by interferometric reflection of coherent light, the number of marks in the fourth series being equal to the number of marks in the first series and each mark within the fourth series being displaced in a circumferential direction with respect to a corresponding mark in the first series by an angular amount equal to three eighths the spacing of the marks in the first series, whereby the third and fourth series of marks can be read to, in conjunction with the first and second series of marks, refine the approximate angular position indication.

6. The optical encoder of claim 5, wherein the annular absolute track further comprises:

at least one start mark formed in the absolute track within each sector and having a common value in all sectors to indicate the start of a sector; and wherein the binary word within each sector further comprises a base 5 word having a unique value identifying the sector, each binary digit of the word being encoded in base 5 by means of its radial alignment with a mark in the first incremental track, a mark in the second incremental track, a mark in the third incremental track, or a mark in the fourth incremental track.

7. The optical encoder of claim 1, further comprising:

a source of coherent light for illuminating the layer along a radius from the axis, the illuminated radius being fixed with respect to rotation of the medium;

an absolute track detector for detecting the portion of the illumination reflected from the marks within the absolute track;

a first incremental track detector for detecting the portion of the illumination reflected from the marks within the first incremental track; and signal processing and decoding means for converting the output of the absolute track detector into a binary word and for interpolating the precise angular position of the medium from the output of the first incremental track detector.

8. The optical encoder of claim 7, further comprising:

an opaque mask positioned between the light source and the optical medium and proximate to the layer;

an absolute track opening in the mask for permitting illumination of a precise area of the absolute track; and a first incremental track opening in the mask for permitting illumination of a precise area of the first incremental track.

9. The optical encoder of claim 7, further comprising:

a non-rotating read head slidably engaging the optical medium;

an absolute track optical collimator affixed to the read head for conveying light from the source of light to the absolute track and for conveying light reflected from the absolute track to the absolute track detector;

an absolute track optical coupler connected between the source of light, the absolute track optical collimator, and the absolute track detector;

an absolute track optical fiber coupling the absolute track optical coupler to the absolute track optical collimator;

a first incremental track optical collimator affixed to the read head for conveying light from the source of light to the first incremental track and for conveying light reflected from the first incremental track to the first incremental track detector;

a first incremental track optical coupler connected between the source of light, the first incremental track optical collimator, and the first incremental track detector; and a first incremental track optical fiber coupling the first incremental track optical coupler to the first incremental track optical collimator.

10. An interferometrically readable optical encoder for sensing angular position, comprising:
   a rotatable optical medium having a data storage layer and an axis of rotation perpendicular to the layer, a plurality of uniformly sized angular sectors being defined in the layer;
   an annular absolute track defined in the layer concentric with the axis;
   a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;
   a first annular incremental track defined in the layer concentric with the axis;
   a first series of incremental marks formed in the layer and evenly spaced around the first incremental track;
   a second annular incremental track defined in the layer concentric with the axis;
   a second series of incremental marks formed in the layer and evenly spaced around the second incremental track, each such incremental mark being detectable by interferometric reflection of coherent light, the number of marks in the second series being equal to the number of marks in the first series and each mark within the second series being displaced in a circumferential direction with respect to a corresponding mark in the first series by an angular amount equal to one eighth the spacing of the marks in the first series;
   a third annular incremental track defined in the layer concentric with the axis;
   a third series of incremental marks formed in the layer and evenly spaced around the third incremental track, each such incremental mark being detectable by interferometric reflection of coherent light, the number of marks in the third series being equal to the number of marks in the first series and each mark within the third series being displaced in a circumferential direction with respect to a corresponding mark in the first series by an angular amount equal to one fourth the spacing of the marks in the first series;
   a fourth annular incremental track defined in the layer concentric with the axis; and
   a fourth series of incremental marks formed in the layer and evenly spaced around the fourth incremental track, each such incremental mark being detectable by interferometric reflection of coherent light, the number of marks in the fourth series being equal to the number of marks in the first series and each mark within the fourth series being displaced in a circumferential direction with respect to a corresponding mark in the first series by an angular amount equal to three eighths the spacing of the marks in the first series,
   whereby the binary word in a sector can be read to identify the angular position of that sector and thereby indicate the approximate angular position of the medium, and
   whereby the first, second, third, and fourth series of incremental marks can be detected to refine the approximate angular position indication and thereby indicate a more precise angular position of the medium.

11. The optical encoder of claim 10, wherein the annular absolute track further comprises:
   at least one start mark formed in the absolute track within each sector and having a common value in all sectors to indicate the start of a sector; and
   wherein the binary word within each sector further comprises a base 5 word having a unique value identifying the sector, each binary digit of the word being encoded in base 5 by means of its radial alignment with a mark in the first incremental track, a mark in the second incremental track, a mark in the third incremental track, or a mark in the fourth incremental track.

12. An interferometrically readable optical encoder for sensing angular position, comprising:
   a rotatable optical medium having a data storage layer and an axis of rotation perpendicular to the layer, a plurality of uniformly sized angular sectors being defined in the layer;
   an annular absolute track defined in the layer concentric with the axis;
   a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;
   $N-1$ annular incremental tracks defined in the layer concentric with the axis, where N is an integer equal to or greater than 2;
   $N-1$ series of incremental marks formed in the layer, the marks in each series being evenly spaced around the corresponding incremental track, each such incremental mark being detectable by interferometric reflection of coherent light, the number of marks in each series being equal and being displaced in a circumferential direction with respect to corresponding marks in the other series so that the marks in the $N-1$ series occupy equally spaced unique circumferential positions of the medium;
   whereby the binary word in a sector can be read to identify the angular position of that sector and thereby indicate the approximate angular position of the medium, and
   whereby the $N-1$ series of incremental marks can be detected to refine the approximate angular position indication and thereby indicate a more precise angular position of the medium.

13. The optical encoder of claim 12, wherein the annular absolute track further comprises:
   at least one start mark formed in the absolute track within each sector and having a common value in all sectors to indicate the start of a sector; and
   wherein the binary word within each sector further comprises a base N word having a unique value identifying the sector, each binary digit of the word being encoded in base N according to its radial alignment with a mark in one of the $N-1$ series.

14. An interferometrically readable optical encoder for sensing angular position, comprising:
   a rotatable optical medium having a data storage layer and an axis of rotation perpendicular to the layer, a plurality of uniformly sized angular sectors being defined in the layer;

an annular absolute track defined in the layer concentric with the axis;

a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;

a first annular incremental track defined in the layer concentric with the axis;

a first series of incremental marks formed in the layer and evenly spaced around the first incremental track;

a source of coherent light for illuminating the layer along a radius from the axis, the illuminated radius being fixed with respect to rotation of the medium;

an absolute track detector for detecting the portion of the illumination reflected from the marks within the absolute track;

a first incremental track detector for detecting the portion of the illumination reflected from the marks within the first incremental track; and signal processing and decoding means for converting the output of the absolute track detector into a binary word to identify the angular position of that sector and thereby indicate the approximate angular position of the medium and for interpolating from the output of the first incremental track detector a more precise angular position of the medium.

15. The optical encoder of claim 14, further comprising:

an absolute track optical coupler for receiving light from the light source;

a first incremental track optical coupler for receiving light from the light source;

an input absolute track optical fiber connected between the absolute track optical coupler and proximate the layer of the medium for illuminating the absolute track within the radius;

a first input incremental track optical fiber connected between the first incremental track optical coupler and proximate the layer for illuminating the first incremental track within the radius;

an output absolute track optical fiber connected between the absolute track optical coupler and the absolute track detector for conveying reflected light from the absolute track to the absolute track detector; and a first output incremental track optical fiber connected between the first incremental track optical coupler and the first incremental track detector for conveying reflected light from the first incremental track to the first incremental track detector.

16. An interferometric method of sensing angular position, comprising the steps of:

providing a rotatable optical medium having a data storage layer and an axis of rotation perpendicular to the layer;

defining a plurality of uniformly sized angular sectors in the layer;

defining an annular absolute track in the layer concentric with the axis;

forming a plurality of absolute marks in the layer in sequence along the absolute track within each sector, each such absolute mark being detectable by interferometric reflection of coherent light as representative of a binary 1 or a binary 0 and each such plurality of absolute marks defining a binary word;

defining a first annular incremental track in the layer concentric with the axis;

forming a first series of incremental marks in the layer and evenly spaced around the first incremental track, each such incremental mark being detectable by interferometric reflection of coherent light;

reading the binary word in a sector to identify the angular position of that sector and thereby indicate the approximate angular position of the medium; and detecting the first series of incremental marks to refine the approximate angular position indication and thereby indicate a more precise angular position for the medium.

17. The method of claim 16, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector having a unique value identifying the sector.

18. The method of claim 16, further comprising the steps of:

defining a second annular incremental track in the layer concentric with the axis;

forming a second series of incremental marks in the layer and evenly spaced around the second incremental track, each such incremental mark being detectable by interferometric reflection of coherent light, the number of marks in the second series being equal to the number of marks in the first series and each mark within the second series being displaced in a circumferential direction with respect to a corresponding mark in the first series by an angular amount equal to one eighth the spacing of the marks in the first series; and detecting the second series of incremental marks to, in conjunction with the first series of incremental marks, refine the approximate angular position indication.

19. The method of claim 18, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector further comprising a base 3 word having a unique value identifying the sector, each binary digit of the word being encoded in base 3 by means of its radial alignment with a mark in the first incremental track or a mark in the second incremental track.

20. The method of claim 18, further comprising the steps of:

defining a third annular incremental track in the layer concentric with the axis;

forming a third series of incremental marks in the layer and evenly spaced around the third incremental track, each such incremental mark being detectable by interferometric reflection of coherent light, the number of marks in the third series being equal to the number of marks in the first series and each mark within the third series being displaced in a circumferential direction with respect to a corresponding mark in the first series by an angular amount equal to one fourth the spacing of the marks in the first series;

defining a fourth annular incremental track in the layer concentric with the axis;

forming a fourth series of incremental marks in the layer and evenly spaced around the fourth incremental track, each such incremental mark being detectable by interferometric reflection of coherent light, the number of marks in the fourth series being equal to the number of marks in the first series and each mark within the fourth series being displaced in a circumferential direction with respect to a corresponding mark in the first series by an angular amount equal to three eighths the spacing of the marks in the first series; and reading the third and fourth series of marks to, in conjunction with the first and second series of marks, refine the approximate angular position indication.

21. The method of claim 20, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector further comprising a base 5 word having a unique value identifying the sector, each binary digit of the word being encoded in base 5 by means of its radial alignment with a mark in the first incremental track, a mark in the second incremental track, a mark in the third incremental track, or a mark in the fourth incremental track.

22. The method of claim 16, further comprising the steps of:

providing a source of coherent light for illuminating the layer along a radius from the axis, the illuminated radius being fixed with respect to rotation of the medium;

detecting the portion of the illumination reflected from the marks within the absolute track;

detecting the portion of the illumination reflected from the marks within the first incremental track;

converting the output of the absolute track detector into a binary word; and interpolating the precise angular position of the medium from the output of the first incremental track detector.

23. The method of claim 22, further comprising the steps of:

positioning an opaque mask between the light source and the optical medium and proximate to the layer;

providing an absolute track opening in the mask to illuminate a precise area of the absolute track; and providing a first incremental track opening in the mask to illuminate a precise area of the first incremental track.

24. The method of claim 22, further comprising the steps of:

providing a non-rotating read head slidably engaging the optical medium;

affixing an absolute track optical collimator to the read head for conveying light from the source of light to the absolute track and for conveying light reflected from the absolute track to the absolute track detector;

connecting an absolute track optical coupler between the source of light, the absolute track optical collimator, and the absolute track detector;

coupling the absolute track optical coupler to the absolute track optical collimator with an absolute track optical fiber;

affixing a first incremental track optical collimator to the read head for conveying light from the source of light to the first incremental track and for conveying light reflected from the first incremental track to the first incremental track detector;

connecting a first incremental track optical coupler between the source of light, the first incremental track optical collimator, and the first incremental track detector; and coupling the first incremental track optical coupler to the first incremental track optical collimator with a first incremental track optical fiber, 25. An interferometric method of sensing angular position, comprising the steps of:

providing a rotatable optical medium having a data storage layer and an axis of rotation perpendicular to the layer;

defining a plurality of uniformly sized angular sectors in the layer;

defining in the layer an annular absolute track concentric with the axis;

forming a plurality of absolute marks in the layer in sequence along the absolute track within each sector, each such absolute mark being detectable by interferometric reflection of coherent light as representative of a binary 1 or a binary 0 and each such plurality of absolute marks defining a binary word;

defining in the layer a first annular incremental track concentric with the axis;

forming a first series of incremental marks in the layer and evenly spaced around the first incremental track;

defining in the layer a second annular incremental track concentric with the axis;

forming a second series of incremental marks in the layer and evenly spaced around the second incremental track, each such incremental mark being detectable by interferometric reflection of coherent light, the number of marks in the second series being equal to the number of marks in the first series and each mark within the second series being displaced in a circumferential direction with respect to a corresponding mark in the first series by an angular amount equal to one eighth the spacing of the marks in the first series;

defining in the layer a third annular incremental track concentric with the axis;

forming a third series of incremental marks in the layer and evenly spaced around the third incremental track, each such incremental mark being detectable by interferometric reflection of coherent light, the number of marks in the third series being equal to the number of marks in the first series and each mark within the third series being displaced in a circumferential direction with respect to a corresponding mark in the first series by an angular amount equal to one fourth the spacing of the marks in the first series;

defining in the layer a fourth annular incremental track concentric with the axis;

forming a fourth series of incremental marks in the layer and evenly spaced around the fourth incremental track, each such incremental mark being detectable by interferometric reflection of coherent light, the number of marks in the fourth series being equal to the number of marks in the first series and each mark within the fourth series being displaced in a circumferential direction with respect to a corresponding mark in the first series by an angular amount equal to three eighths the spacing of the marks in the first series;

reading the binary word in a sector to identify the angular position of that sector and thereby indicate the approximate angular position of the medium; and detecting the first, second, third, and fourth series of marks to refine the approximate angular position indication and thereby indicate a more precise angular position for the medium.

26. The method of claim 25, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector further comprising a base 5 word having a unique value identifying the sector, and each binary digit of the word being encoded in base 5 by means of its radial alignment with a mark in the first incremental track, a mark in the second incremental track, a mark in the third incremental track, or a mark in the fourth incremental track.

27. An interferometric method for sensing angular position, comprising the steps of:

providing a rotatable optical medium having a data storage layer and an axis of rotation perpendicular to the layer;

defining a plurality of uniformly sized angular sectors in the layer;

defining in the layer an annular absolute track concentric with the axis;

forming a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;

defining in the layer N−1 annular incremental tracks concentric with the axis, where N is an integer equal to or greater than 2;

forming N−1 series of incremental marks in the layer and evenly spaced around the corresponding incremental track, each such incremental mark being detectable by interferometric reflection of coherent light, the number of marks in each series being equal and being displaced in a circumferential direction with respect to corresponding marks in the other series so that the marks in the N−1 series occupy equally spaced unique circumferential positions of the medium;

reading the binary word in a sector to identify the angular position of that sector and thereby indicate the approximate angular position of the medium, and detecting the N−1 series of marks to refine the approximate angular position indication and thereby indicate a more precise angular position for the medium.

28. The method of claim 27, wherein the step of forming a plurality of absolute marks in sequence along the absolute track further comprises the steps of:

forming at least one start mark in the absolute track within each sector, the start mark having a common value in all sectors to indicate the start of a sector, the base N word within each sector having a unique value identifying the sector and each binary digit of the sector word being encoded in base N by means of its radial alignment with a mark in one of the N−1 series.

29. An interferometric method of sensing angular position, comprising the steps of:

providing a rotatable optical medium having a data storage layer and an axis of rotation perpendicular to the layer;

defining a plurality of uniformly sized angular sectors in the layer;

defining in the layer an annular absolute track concentric with the axis;

forming a plurality of absolute marks in the layer in sequence along the absolute track within each sector, each such absolute mark being detectable by interferometric reflection of coherent light as representative of a binary 1 or a binary 0 and each such plurality of absolute marks defining a binary word;

defining in the layer a first annular incremental track concentric with the axis; and forming a first series of incremental marks in the layer and evenly spaced around the first incremental track;

providing a source of coherent light for illuminating the layer along a radius from the axis, the illuminated radius being fixed with respect to rotation of the medium;

detecting the portion of the illumination reflected from the marks within the absolute track;

converting the output of the absolute track detector into a binary word to identify the angular position of that sector and thereby indicate the approximate angular position of the medium;

detecting the portion of the illumination reflected from the marks within the first incremental track; and interpolating the precise angular position of the medium from the output of the first incremental track detector.

30. The method of claim 29, further comprising the steps of:

providing an absolute track optical coupler for receiving light from the light source;

providing a first incremental track optical coupler for receiving light from the light source;

connecting an input absolute track optical fiber between the absolute track optical coupler and proximate the layer of the medium for illuminating the absolute track within the radius;

connecting a first input incremental track optical fiber between the first incremental track optical coupler and proximate the layer for illuminating the first incremental track within the radius;

connecting an output absolute track optical fiber between the absolute track optical coupler and the absolute track detector for conveying reflected light from the absolute track to the absolute track detector; and connecting a first output incremental track optical fiber between the first incremental track optical coupler and the first incremental track detector for conveying reflected light from the first incremental track to the first incremental track detector.

* * * * *